US009213213B2

(12) United States Patent  
Park et al.

(10) Patent No.: US 9,213,213 B2  
(45) Date of Patent: Dec. 15, 2015

(54) THREE-DIMENSIONAL IMAGE DISPLAY APPARATUS

(75) Inventors: Cheolwoo Park, Suwon-si (KR); Joo-Young Kim, Suwon-si (KR); Jung-taek Kim, Seoul (KR); Geunjeong Park, Daegu (KR); KyoungHo Lim, Yongin-si (KR); Ji-woong Jeong, Yongin-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 524 days.

(21) Appl. No.: 13/548,417

(22) Filed: Jul. 13, 2012

(65) Prior Publication Data

US 2013/0222713 A1 Aug. 29, 2013

(30) Foreign Application Priority Data

Feb. 24, 2012 (KR) .................... 10-2012-0019257

(51) Int. Cl.
*G09G 3/36* (2006.01)
*G02F 1/29* (2006.01)
*H04N 13/02* (2006.01)
*H04N 13/04* (2006.01)
(Continued)

(52) U.S. Cl.
CPC .............. *G02F 1/29* (2013.01); *G02B 27/2264* (2013.01); *G09G 3/3611* (2013.01); *H04N 13/0289* (2013.01); *H04N 13/0404* (2013.01); *H04N 13/0415* (2013.01); *G02F 2001/294* (2013.01); *G09G 3/003* (2013.01); *G09G 3/3614* (2013.01); *G09G 2310/08* (2013.01); *G09G 2320/0252* (2013.01); *G09G 2340/16* (2013.01); *G09G 2370/08* (2013.01)

(58) Field of Classification Search
CPC ................ G09G 2310/0286; G09G 2310/08; G09G 3/003; G09G 3/3611; G09G 3/3614; G02F 1/29; H04N 13/0404; H04N 13/0406; H04N 13/0415; H04N 13/0289
USPC ................... 345/98–100; 349/1–15, 33, 200; 348/51; 359/462; 377/64–81
See application file for complete search history.

(56) References Cited

U.S. PATENT DOCUMENTS 6,429,836 B1 * 8/2002 Hansen ...................... 345/74.1
6,577,376 B1    6/2003 Shih
7,812,923 B2   10/2010 Kim
(Continued)

FOREIGN PATENT DOCUMENTS

JP     2007-310068 A    11/2007
KR    1020090089694 A    8/2009
(Continued)

*Primary Examiner* — Michael Pervan
*Assistant Examiner* — Andrew Lee
(74) *Attorney, Agent, or Firm* — Cantor Colburn LLP

(57) ABSTRACT

A three-dimensional image display apparatus includes a display panel which receives light and displays an image, a liquid crystal lens panel which refracts the light exiting from the display panel, a lens driver which drives the liquid crystal lens panel, a timing controller which controls the lens driver, a power supply unit which provides the liquid crystal lens panel with a driving voltage in response to a control of the timing controller, and a driver data value storage unit which stores a driver data value and applies the driver data value stored therein to the lens driver when the data driver storage unit is turned on, where the lens driver operates the liquid crystal lens panel using the driving voltage and the driver data value in response to the control of the timing controller.

18 Claims, 7 Drawing Sheets

(51) Int. Cl.
*G02B 27/22* (2006.01)
*G09G 3/00* (2006.01)

(56) References Cited

U.S. PATENT DOCUMENTS

| | | | |
|---|---|---|---|
| 2006/0197734 A1* | 9/2006 | Morita | 345/100 |
| 2007/0121072 A1 | 5/2007 | Misawa et al. | |
| 2008/0225219 A1* | 9/2008 | Saito | 349/150 |
| 2010/0013823 A1* | 1/2010 | Kwon et al. | 345/214 |
| 2011/0032438 A1* | 2/2011 | Yun et al. | 349/15 |
| 2011/0063533 A1 | 3/2011 | Kim et al. | |
| 2011/0157499 A1 | 6/2011 | Lee et al. | |
| 2012/0154556 A1* | 6/2012 | An et al. | 348/51 |

FOREIGN PATENT DOCUMENTS

| | | |
|---|---|---|
| KR | 1020100048819 A | 5/2010 |
| KR | 1020100075302 A | 7/2010 |

* cited by examiner

THREE-DIMENSIONAL IMAGE DISPLAY APPARATUS

This application claims priority to Korean Patent Application No. 10-2012-0019257, filed on Feb. 24, 2012, and all the benefits accruing therefrom under 35 U.S.C. §119, the content of which in its entirety is herein incorporated by reference.

BACKGROUND

1. Field

Exemplary embodiments in the disclosure relate to a three-dimensional ("3D") image display apparatus. More particularly, the present disclosure relates to a 3D image display apparatus with reduced number of parts and interfaces to simplify an operation of a liquid crystal lens panel and with reduced power consumption.

2. Description of the Related Art

In general, a 3D image display apparatus is classified into a stereoscopic type display apparatus and an auto-stereoscopic type display apparatus based on the driving method thereof. The auto-stereoscopic display apparatus utilizes a parallax barrier or a lenticular lens to display a 3D image. The lenticular lens is typically configured to include a convex lens or a Fresnel lens, and a left-eye image and a right-eye image are refracted by the convex lens or the Fresnel lens such that a viewer perceives the 3D image.

In recent, a 3D image display apparatus that switches a two-dimensional ("2D") image and the 3D image with each other has been developed, and such a 3D image display apparatus includes a separate panel used to switch the 2D image and the 3D image with each other. The 3D image display apparatus that switches a 2D image and the 3D image with each other may include a barrier liquid crystal panel or a liquid crystal lens panel. The barrier liquid crystal panel provides a parallax barrier when a power source is applied to the barrier liquid crystal panel, to thereby provide the 3D image to the viewer, and the liquid crystal lens panel refracts light by being operated as a lens in response to the power source so as to provide the 3D image to the viewer.

When no power source is applied to the liquid crystal lens panel, the light exiting from the display panel passes through the liquid crystal lens panel essentially unchanged. However, when the power source is applied to the liquid crystal lens panel, an arrangement of liquid crystal molecules of the liquid crystal lens panel is changed to operate as the convex lens or the Fresnel lens. Accordingly, the light from the display panel is refracted by the liquid crystal lens panel operated as the convex lens or the Fresnel lens. The light refracted by the liquid crystal lens panel is provided to the viewer as the 3D image.

The 3D image display apparatus including the liquid crystal lens panel includes a timing controller that controls the display panel and additional timing controllers that control the liquid crystal lens panel. Accordingly, the 3D image display apparatus may include separate printed circuit boards to mount the timing controllers thereon.

In addition, the timing controllers, which control the liquid crystal lens panel, separately receive data signals used to drive the display panel and apply the data signals to driving integrated circuits ("IC"s) used to drive the liquid crystal lens panel. Since the driving ICs separately receive the data signals used to drive the display panel and drive the liquid crystal lens panel, the driving ICs used to drive the liquid crystal lens panel have the same circuit configurations as the circuit configurations of driving ICs used to drive the display panel. Accordingly, the driving ICs for the liquid crystal lens panel may include various interfaces since the driving ICs for the liquid crystal lens panel generates data voltages used to drive the liquid crystal lens panel using data values provided every frame.

SUMMARY

Exemplary embodiments in the disclosure relate to a three-dimensional ("3D") image display apparatus, in which the number of parts and interfaces is reduced such that an operation of a liquid crystal lens panel is substantially simplified and power consumption is substantially reduced.

In an exemplary embodiment, a 3D image display apparatus includes a display panel which receives light and displays an image, a liquid crystal lens panel which refracts the light exiting from the display panel, a lens driver which drives the liquid crystal lens panel, a timing controller which controls the lens driver, a power supply unit which provides the liquid crystal lens panel with a driving voltage in response to a control of the timing controller, and a driver data value storage unit which stores a driver data value and applies the driver data value stored therein to the lens driver when the data driver storage unit is turned on. In such an embodiment, the lens driver operates the liquid crystal lens panel using the driving voltage and the driver data value in response to the control of the timing controller.

In an exemplary embodiment, the lens driver may include a plurality of driver integrated circuits ("IC"s) which drives the liquid crystal lens panel.

In an exemplary embodiment, the driver ICs may be disposed on the liquid crystal lens panel.

In an exemplary embodiment, the driver ICs may include a first driver IC which provides a read-out signal to a driver data value storage unit in synchronization with a serial clock signal and receives the driver data value from the driver data value storage unit in response to the read signal, and a plurality of second driver ICs connected to the first driver IC. In such an embodiment, the first driver IC may provide the driver data value to an adjacent second driver IC of the second driver ICs, and each of the second driver ICs may provide the driver data value to a subsequent second driver IC disposed adjacent thereto.

In an exemplary embodiment, each of the first and second driver ICs may include a memory which stores the driver data value, a reference voltage generator which generates a reference voltage using the driving voltage, and a driving voltage generator which generates a liquid crystal lens driving voltage corresponding to the driver data value using the reference voltage in response to a horizontal start signal provided from the timing controller. In such an embodiment, the driving voltage generator may convert a polarity of the liquid crystal lens driving voltage in response to a polarity control signal provided from the timing controller to alternately output the liquid crystal lens driving voltage and the converted liquid crystal lens driving voltage every frame, and the driving voltage generator may apply the liquid crystal lens driving voltage and the converted liquid crystal lens driving voltage to the liquid crystal lens panel in synchronization with a vertical synchronization signal provided from the timing controller.

In an exemplary embodiment, the driver data value may include a first data value, a second data value, and a polarity set value, and the liquid crystal lens driving voltage may include an over-driving voltage corresponding to the first data value and a normal driving voltage corresponding to the second data value and having a level lower than a level of the over-driving voltage.

In an exemplary embodiment, each frame may include a first sub-frame in which the over-driving voltage is output and a second sub-frame in which the normal driving voltage is output. In an exemplary embodiment, the vertical synchronization signal may include a first vertical synchronization signal and a second vertical synchronization signal subsequent to the first vertical synchronization signal. In such an embodiment, the over-driving voltage may be output in synchronization with the first vertical synchronization signal, and the normal driving voltage may be output in synchronization with the second vertical synchronization signal.

In an exemplary embodiment, the driving voltage generator may output a positive liquid crystal lens driving voltage when the polarity set value is one (1). In such an embodiment, the driving voltage generator may convert the polarity of the liquid crystal lens driving voltage in response to the polarity control signal to output a negative liquid crystal lens driving voltage, and the positive and negative liquid crystal lens driving voltages may be sequentially and alternately output.

In an exemplary embodiment, the driving voltage generator may output a negative liquid crystal lens driving voltage when the polarity set value is zero (0). In such an embodiment, the driving voltage generator may convert the polarity of the liquid crystal lens driving voltage in response to the polarity control signal to output a positive liquid crystal lens driving voltage, and the negative and positive liquid crystal lens driving voltages may be sequentially and alternately output.

According to exemplary embodiments, the 3D image display apparatus may include reduced number of parts and interfaces such that an operation of a liquid crystal lens panel is substantially simplified and power consumption is substantially reduced.

BRIEF DESCRIPTION OF THE DRAWINGS

The above and other features of the invention will become more apparent by describing in further detail exemplary embodiments thereof with reference to the accompanying drawings, in which.

DETAILED DESCRIPTION

Figure 1:
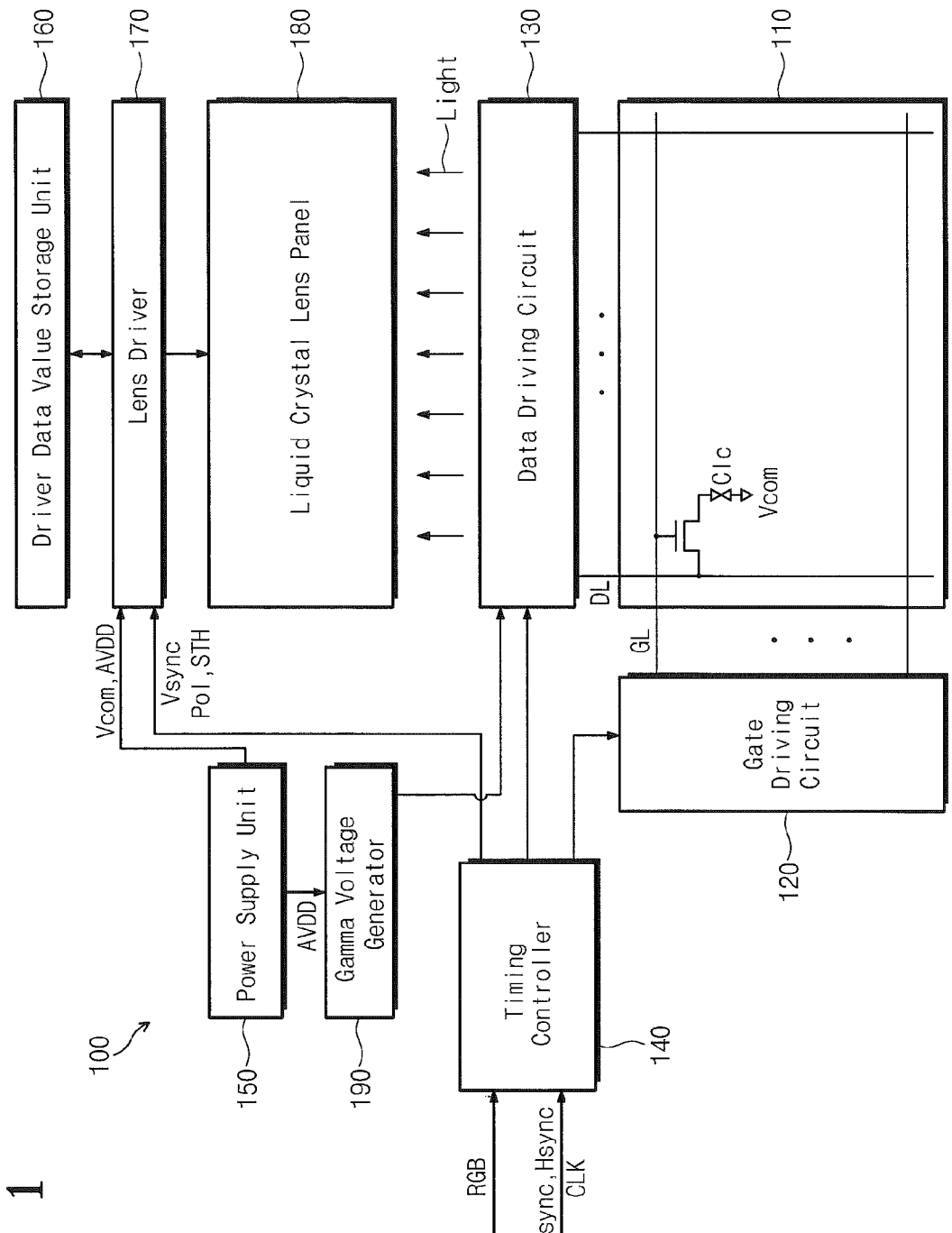
FIG. 1 is a block diagram showing an exemplary embodiment of a three-dimensional ("3D") image display apparatus according to the invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of the invention will be described in detail with reference to the accompanying drawings.

FIG. 1 is a block diagram showing an exemplary embodiment of a three-dimensional ("3D") image display apparatus according to the invention.

Referring to FIG. 1, an exemplary embodiment of a 3D image display apparatus 100 includes a display panel 110, a gate driving circuit 120, a data driving circuit 130, a timing controller 140, a power supply unit 150, a driver data value storage unit 160, a lens driver 170, a liquid crystal lens panel 180 and a gamma voltage generator 190.

The display panel 110 includes a first substrate (not shown) having a thin film transistor ("TFT") disposed thereon, a second substrate (not shown) having a common electrode disposed thereon, and a liquid crystal layer (not shown) interposed between the first and second substrates. The first substrate includes a plurality of gate lines GL, a plurality of data lines DL insulated from the gate lines while crossing the gate lines GL, a liquid crystal capacitor Clc that receives a data voltage (or a gray scale display voltage), and the TFT that applies the data voltage provided through the data lines DL to the liquid crystal capacitor Clc in response to a scan signal provided through the gate lines GL. The TFT includes a gate electrode connected to a corresponding gate line of the gate lines GL, a source electrode connected to a corresponding data line of the data lines DL, and a drain electrode connected to a pixel electrode (not shown) of the liquid crystal capacitor Clc.

In an exemplary embodiment, the display panel 110 includes pixels disposed in areas defined by the data lines DL and the gate lines GL, and each of the pixels includes the TFT and the pixel electrode. In such an embodiment, the pixels display an image in response to the scan signal sequentially applied through the gate lines GL and the data voltage provided through the data lines DL.

In an alternative exemplary embodiment, the 3D image display apparatus 100 may further include a backlight unit (not shown) that provides the display panel 110 with light. The backlight unit includes a light source that generates and emits the light, and the light source may be, but not limited to, a fluorescent lamp or a light emitting diode, for example.

The display panel 110 may be, but not limited to, a liquid crystal display panel or an organic light emitting display panel, for example. The display panel 110 may be the liquid crystal display panel employing one of various types of liquid crystal modes, such as a twisted nematic ("TN") mode, a vertical alignment ("VA") mode, an in-plane switching ("IPS") mode and a patterned vertical alignment ("PVA") mode, for example, but not being limited thereto. In an exemplary embodiment, the display panel 110 is configured to include the organic light emitting display panel, and the backlight unit may be omitted from the 3D image display apparatus 100.

The timing controller 140 provides an image data RGB received from an external device (not shown), e.g., a system board, to the data driving circuit 130. The image data RGB includes a two-dimensional ("2D") image when the 3D image display apparatus 100 is operated in a 2D mode. The image data RGB includes a 3D image when the 3D image display apparatus 100 is operated in a 3D mode.

The 3D image may be defined as an interlace image, and the interlace image includes left and right images alternately displayed on the display panel 110.

The timing controller 140 generates control signals to control an operation timing of the data driving circuit 130 and the gate driving circuit 120 using timing signals, such as a vertical synchronization signal Vsync, a horizontal synchronization signal Hsync and a dot clock CLK, for example, provided from an external source.

The control signals include a gate timing control signal that controls an operation timing of the gate driving circuit 120, and a data timing control signal that controls an operation timing of the data driving circuit 130 and a polarity of the data voltage.

In an exemplary embodiment, when the display panel 110 is operated in the 3D mode, the timing controller 140 applies the vertical synchronization signal Vsync from the external source, a horizontal start signal STH and a polarity control signal Pol to the liquid crystal lens panel 180. In an exemplary embodiment, the horizontal start signal STH informs a start of an operation of the data driving circuit 130, and the polarity control signal Pol controls the polarity of the data voltage. In such an embodiment, the timing controller 140 may switch the operation mode of the display panel 110 from the 2D mode to the 3D mode, and vice versa, in response to a mode signal (not shown) provided from an external source.

The power supply unit 150 generates an analog power voltage AVDD and a common voltage Vcom. The power supply unit 150 applies the analog power voltage AVDD to the gamma voltage generator 190 and the common voltage Vcom to the display panel 110. The common voltage Vcom applied to the display panel 110 is applied to the common electrode.

In an exemplary embodiment, when the display panel 110 is operated in the 3D mode, the power supply unit 150 applies the common voltage Vcom and the analog power voltage AVDD to the liquid crystal lens panel 180 as a driving voltage in response to the control of the timing controller 140. In such an embodiment, when the display panel 110 is operated in the 2D mode, the power supply unit 150 does not apply the common voltage Vcom and the analogue power voltage AVDD to the liquid crystal lens panel 180 in response to the control of the timing controller 140.

The gamma voltage generator 190 generates a gamma voltage using the analog power voltage AVDD from the power supply unit 150 and applies the generated gamma voltage to the data driving circuit 130.

The gate driving circuit 120 and the data driving circuit 130 drive the display panel 110 in response to the control of the timing controller 140. In an exemplary embodiment, the gate driving circuit 120 sequentially applies a scan signal to the gate lines GL in response to a gate timing control signal from the timing controller 140. In such an embodiment, the pixels are driven in response to the scan signal sequentially applied through the gate lines GL in the unit of pixel row.

The data driving circuit 130 converts the image data RGB from the timing controller 140 to the data voltage, which is an analog signal, using the gamma voltage provided from the gamma voltage generator 190. The data driving circuit 130 applies the data voltage to the data lines DL. The data voltage provided to the data lines DL is applied to the pixels driven by the scan signal.

A driver data value D_Data (shown in FIG. 2) is pre-stored in the driver data value storage unit 160 to operate the liquid crystal lens panel 180. When the 3D image display apparatus 100 is turned on, the driver data value storage unit 160 applies the driver data value D_Data to the lens driver 170 through a serial interface connection (or a serial communication) with the lens driver 170. In an exemplary embodiment, the driver data value storage unit 160 may include a programmable read-only memory ("PROM"). In such an embodiment, the driver data value D_Data is stored in the PROM.

The liquid crystal lens panel 180 is operated in the 2D mode or the 3D mode. In an exemplary embodiment, when the display panel 110 displays the 2D image, the lens driver 170 does not operate the liquid crystal lens panel 180, that is, the lens driver 170 does not generate a voltage required to drive the liquid crystal lens panel 180. In such an embodiment, the light exiting from the display panel 110 passes through the liquid crystal lens panel 180 without being refracted such that the 2D image is provided to the viewer.

In such an embodiment, when the display panel 110 displays the 3D image, the lens driver 170 generates a liquid crystal lens driving voltage using the common voltage Vcom, the analog power voltage AVDD and the driver data value D_Data in response to the control signals from the timing controller 140, such as the vertical synchronization signal Vsync, the polarity control signal Pol and the horizontal start signal STH, for example. In such an embodiment, the lens driver 170 applies the generated liquid crystal lens driving voltage to the liquid crystal lens panel 180.

The liquid crystal lens panel 180 may serve as a Fresnel lens in response to the driving voltage, and the light traveling to the liquid crystal lens panel 180 from the display panel 110 is refracted by the liquid crystal lens panel 180 such that the 3D image is provided to the viewer.

In such an embodiment, the 3D image display apparatus 100 does not include an additional timing controller for the control of the liquid crystal lens panel 180. In such an embodiment, the driver data value D_Data is pre-stored in the driver data value storage unit 160 to operate the liquid crystal lens panel 180. In such an embodiment, the driver data value D_Data pre-stored in the driver data value storing part 160 is used to operate the liquid crystal lens panel 180 without using various image data provided to the data driving circuit 130 every frame. In such an embodiment, an interface of the 3D image display apparatus 100 is thereby substantially simplified, and the number of parts and interfaces used in the 3D image display apparatus 100 is substantially decreased such that the operation of the liquid crystal lens panel 180 is substantially simplified and the power consumption in the 3D image display apparatus 100 is substantially reduced.

Figure 2:
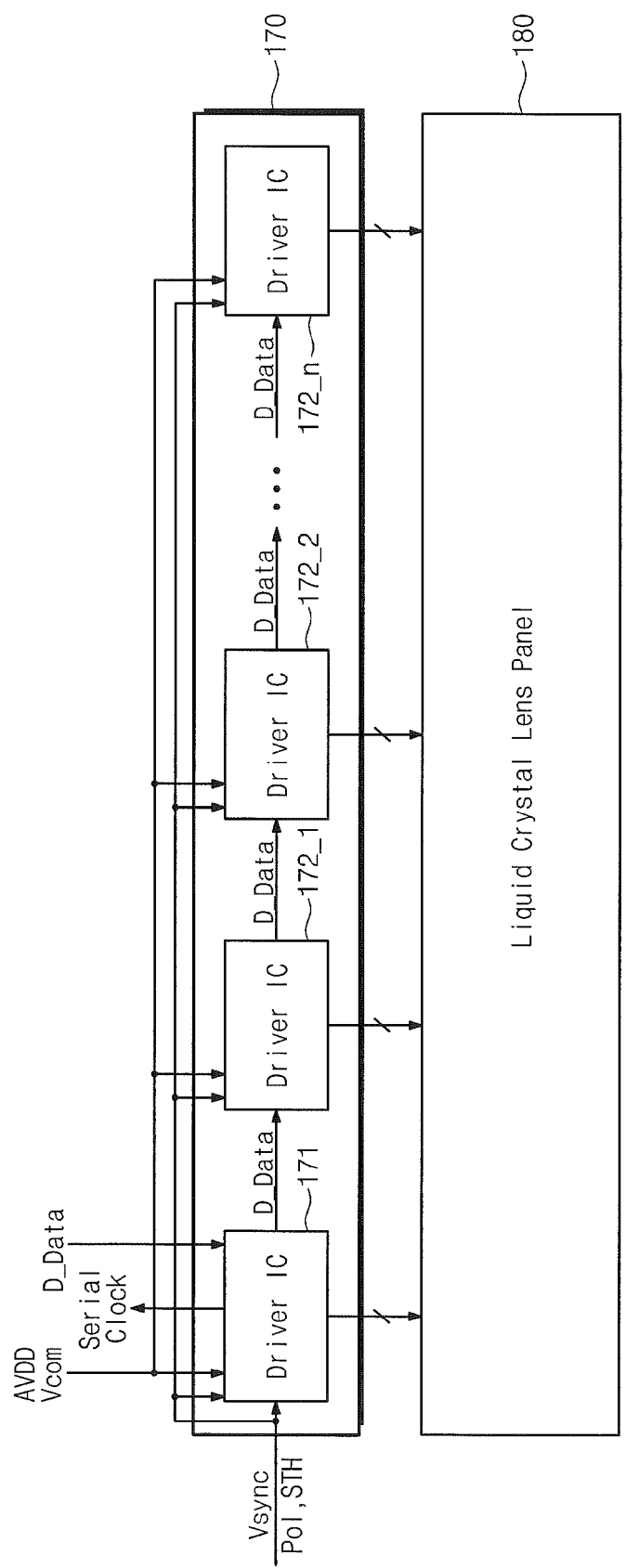
FIG. 2 is a block diagram showing an exemplary embodiment of a lens driver shown in FIG. 1.

FIG. 2 is a block diagram showing an exemplary embodiment of the lens driver shown in FIG. 1.

Referring to FIG. 2, the lens driver 170 includes a plurality of driver integrated circuits ("IC"s) 171 and 172_1 to 172_n to drive the liquid crystal lens panel 180.

In an exemplary embodiment, the driver ICs 171 and 172_1 to 172_n may be configured as an integrated circuit. In an exemplary embodiment, the driver ICs 171 and 172_1 to 172_n may be directly mounted on the liquid crystal lens panel 180.

The driver ICs 171 and 172_1 to 172_n include a first driver IC 171 and a plurality of second driver ICs 172_1 to 172_n. In an exemplary embodiment, the first driver IC 171 is disposed at an end of the lens driver 170 and the second driver ICs 172_1 to 172_n are disposed adjacent to the first driver IC 171 toward an opposing end of the lens driver 70 along a horizontal direction. In one exemplary embodiment, for example, the first driver IC 171 is disposed at a leftmost end of the lens driver 170 and the second driver ICs 172_1 to 172_n are disposed at a right side of the first driver IC 171 in a horizontal direction. However, the arrangement of the first and second driver ICs 171 and 172_1 to 172_n should be not limited to the above-mentioned arrangement. In an alternative exemplary embodiment, the first driver IC 171 may be disposed at a rightmost end of the lens driver 170 and the second driver ICs 172_1 to 172_n may be disposed at a left side of the first driver IC 171 in the horizontal direction. In an exemplary embodiment, the first driver IC 171 may be disposed at any position between the second driver ICs 172_1 to 172_n.

The first driver IC 171 receives the driver data value D_Data from the driver data value storage unit 160. The first driver IC 171 applies the received driver data value D_Data to a second driver disposed adjacent thereto, e.g., a first second driver IC172_1. Each of the second driver ICs 172_1 to 172_n applies the received driver data value D_Data to a second driver IC disposed adjacent thereto. Each of the first and second driver ICs 171 and 172_1 to 172_n stores the driver data value D_Data therein.

In an exemplary embodiment, the horizontal start signal STH serves as a signal indicating a start of operation of each of the first and second driver ICs 171 and 172_1 to 172_n. Each of the first and second driver ICs 171 and 172_1 to 172_n generates the driving voltage to operate the liquid crystal lens panel 180 in response to the horizontal start signal STH. In such an embodiment, each of the first and second driver ICs 171 and 172_1 to 172_n determines a polarity of the driving voltage in response to the polarity control signal Pol. In such an embodiment, each of the first and second driver ICs 171 and 172_1 to 172_n converts the polarity of the driving voltage and alternately outputs the driving voltage and the converted driving voltage. The driving voltage is output in synchronization with the vertical synchronization signal Vsync. In an exemplary embodiment, the liquid crystal lens panel 180 may be operated to serve as the Fresnel lens in response to the driving voltage.

Figure 3:
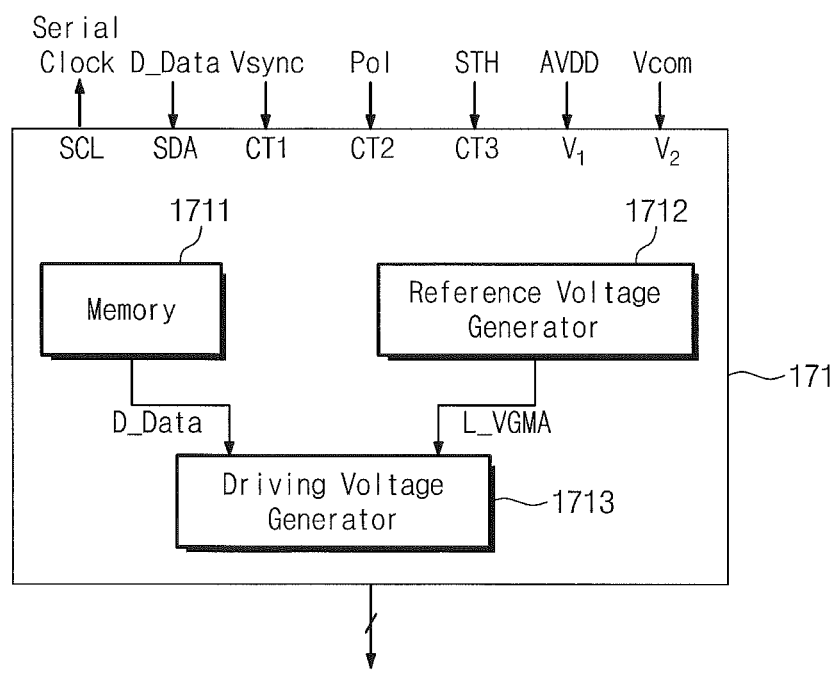
FIG. 3 is a block diagram showing an exemplary embodiment of a first driver integrated circuit ("IC") shown in FIG. 2.
Figure 4:
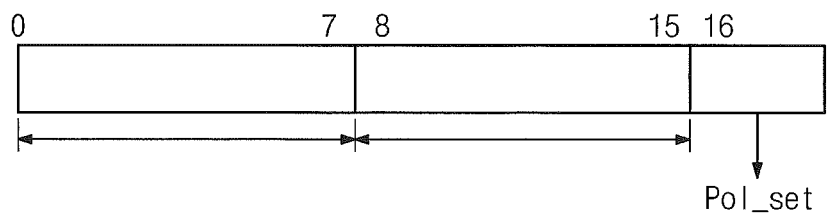
FIG. 4 is a block diagram showing an exemplary embodiment of a driver data value stored in an exemplary embodiment of a driver data value storage unit shown in FIG. 1.

FIG. 3 is a block diagram showing an exemplary embodiment of the first driver IC shown in FIG. 2, and FIG. 4 is a block diagram showing an exemplary embodiment of the driver data value stored in the driver data value storage unit shown in FIG. 1.

Referring to FIG. 3, the first driver IC 171 includes a serial clock terminal SCL, a serial data terminal SDA, a first control terminal CT1, a second control terminal CT2, a third control terminal CT3, a first voltage receiving terminal $V_1$, a second voltage receiving terminal $V_2$, a memory 1711, a reference voltage generator 1712, and a driving voltage generator 1713.

In an exemplary embodiment, the second driver ICs 172_1 to 172_n have substantially the same configuration as the first driver IC 171 except that the second driver ICs 172_1 to 172_n do not include the serial clock terminal SCL and the serial data terminal SDA. In such an embodiment, each of the second driver ICs 172_1 to 172_n includes the first control terminal CT1, the second control terminal CT2, the third control terminal CT3, the first voltage receiving terminal $V_1$, the second voltage receiving terminal $V_2$, the memory 1711, the reference voltage generator 1712 and the driving voltage generator 1713.

The first driver IC 171 communicates with the driver data value storage unit 160 via a serial interface when the 3D image display apparatus 100 is turned on. In an exemplary embodiment, the first driver IC 171 outputs a serial clock signal through the serial clock terminal SCL and outputs a read-out signal as a serial data through the serial data terminal SDA. The read-out signal is output in synchronization with the serial clock signal, and the serial clock signal and the read-out signal are transmitted to the driver data value storage unit 160. In such an embodiment, the first driver IC 171 is defined as a master device, and the driver data value storage unit 160 is defined as a slave device.

The driver data value storage unit 160 transmits the driver data value D_Data to the first driver IC 171 in response to the read-out signal. The first driver IC 171 receives the driver data value D_Data through the serial data terminal SDA. The driver data value D_Data provided to the first driver IC 171 is stored in the memory 1711 of the first driver IC 171.

In an exemplary embodiment, the first driver IC 171 provides the driver data value D_Data stored in the memory 1711 thereof to the second driver IC disposed adjacent thereto, e.g., the first second driver IC 172_1. The second driver IC 172_1 applies the driver data value D_Data from the first driver IC 171 to the second driver IC disposed adjacent to at the right side thereof, e.g., the second second driver IC 172_2. Upon repeatedly performing the above-mentioned operation, the driver data value D_Data is provided to an n-th second driver IC 172_n disposed at the rightmost end of the lens driver 170. In such an embodiment, each of the second driver ICs 172_1 to 172_n provides the received driver data value D_Data to the second driver IC disposed adjacent to the right side thereof.

The driver data value D_Data is stored in the memory 1711 of each of the second driver ICs 172_1 to 172_n.

Each of the first driver IC 171 and the second driver ICs 172_1 to 172_n receive the analog power voltage AVDD through the first voltage receiving terminal $V_1$ thereof and receive the common voltage Vcom through the second voltage receiving terminal $V_2$ thereof. In an exemplary embodiment, each of the first driver IC 171 and the second driver ICs 172_1 to 172_n receive the vertical synchronization signal Vsync through the first control terminal CT1 thereof, the polarity control signal Pol through the second control terminal CT2 thereof and the horizontal start signal STH through the third control terminal CT3 thereof.

Each of first and second the driver ICs 171 and 172_1 to 172_n stores the driver data value D_Data in the memory 1711 thereof, and then each of first and second the driver ICs 171 and 172_1 to 172_n generates the driving voltage in response to the horizontal start signal STH.

In an exemplary embodiment, the reference voltage generator 1712 of each of the first and second driver ICs 171 and 172_1 to 172_n generates a linear gamma reference voltage L_VGMA (hereinafter, referred to as a reference voltage) using the analog power voltage AVDD and the common voltage Vcom. In such an embodiment, each of the first and second driver ICs 171 and 172_1 to 172_n generates the reference voltage, which is linearly changed.

The driving voltage generator 1713 of each of the first and second driver ICs 171 and 172_1 to 172_n receives the driver data value D_Data from the memory 1711 and receives the reference voltage L_VGMA from the reference voltage generator 1712. The liquid crystal lens driving voltage generator 1713 generates the driving voltage corresponding to the driver data value D_Data using the reference voltage L_VGMA. The driving voltage generator 1713 converts the polarity of the liquid crystal lens driving voltage and alternately outputs the liquid crystal lens driving voltage and the converted liquid crystal lens driving voltage in response to the polarity control signal Pol.

Referring to FIG. 4, an exemplary embodiment of the driver data value D_Data includes a first data value Data1, a second data value Data2 and a polarity set value Pol_set.

In such an embodiment, the driver data value D_Data may have k bits. Among the k bits, the first data value Data1 is stored in l bits, the second data value Data2 is stored in m bits, and the polarity set value Pol_set is stored in j bits. Each of the k, l, m and j is a constant number greater than zero (0), and k is equal to a sum of l, m and j, that is, k, l, m and j satisfy the following equation: k=l+m+j.

In an exemplary embodiment, as shown in FIG. 4, the driver data value D_Data may be represented with 17 bits, where k, l, m and j are 17, 8, 8 and 1, respectively. The first data value Data1 is stored from the zeroth bit to the seventh bit, the second data value Data2 is stored from the eighth bit to the fifteenth bit, and the polarity set value Pol_set is stored in the sixteenth bit.

The liquid crystal lens driving voltage includes an over-driving voltage corresponding to the first data value Data1 and a normal driving voltage corresponding to the second data value Data2. The over-driving voltage has a level higher than a level of the normal driving voltage.

Referring again to FIG. 3, the driving voltage generator 1713 outputs the over-driving voltage to the liquid crystal lens panel 180 in synchronization with the vertical synchronization signal Vsync, and then outputs the normal driving voltage to the liquid crystal lens panel 180 in synchronization with the vertical synchronization signal Vsync. When a voltage is applied to an input terminal of the liquid crystal lens panel 180, a signal transmission speed is decreased due to resistance and capacitance of metal lines used to transmit the signals. This may be defined as resistive-capacitive ("RC") delay, and the over-driving voltage is output to the liquid crystal lens panel 180 before applying the normal-driving voltage to the liquid crystal lens panel 180 to reduce the RC delay.

The driving voltage generator 1713 determines the polarity of the liquid crystal lens driving voltage based on the polarity set value Pol_set.

In an exemplary embodiment, when the polarity set value Pol_set is set to 1, the driving voltage generator 1713 outputs the liquid crystal lens driving voltage having a positive (+) polarity. Then, the driving voltage generator 1713 converts the polarity of the liquid crystal lens driving voltage and alternately outputs the positive (+) liquid crystal lens driving voltage and a negative (−) liquid crystal lens driving voltage.

In such an embodiment, when the polarity set value Pol_set is 0, the driving voltage generator 1713 outputs the liquid crystal lens driving voltage having the negative (−) polarity. Then, the driving voltage generator 1713 converts the polarity of the liquid crystal lens driving voltage and alternately outputs the negative (−) liquid crystal lens driving voltage and the positive (+) liquid crystal lens driving voltage.

In an exemplary embodiment, the positive (+) liquid crystal lens driving voltage and the negative (−) liquid crystal lens driving voltage are alternately applied to the liquid crystal lens panel 180. The liquid crystal lens panel 180 is driven by the positive (+) and negative (−) liquid crystal lens driving voltages.

According to an exemplary embodiment of 3D image display apparatus including the above-mentioned configuration of the driver ICs 171 and 172_1 to 172_n, the 3D image display apparatus 100 does not include an additional timing controller to control the liquid crystal lens panel 180. In such an embodiment, the lens driver 170 uses the driver data value D_Data stored in the driver data value storage unit 160 to operate the liquid crystal lens panel 180 such that the interface of the 3D image display apparatus 100 is substantially simplified.

In such an embodiment, the number of parts and interfaces used in the 3D image display apparatus 100 are decreased, thereby simplifying the operation of the liquid crystal lens panel 180 and reducing the power consumption of the liquid crystal lens panel 180.

Figure 5:
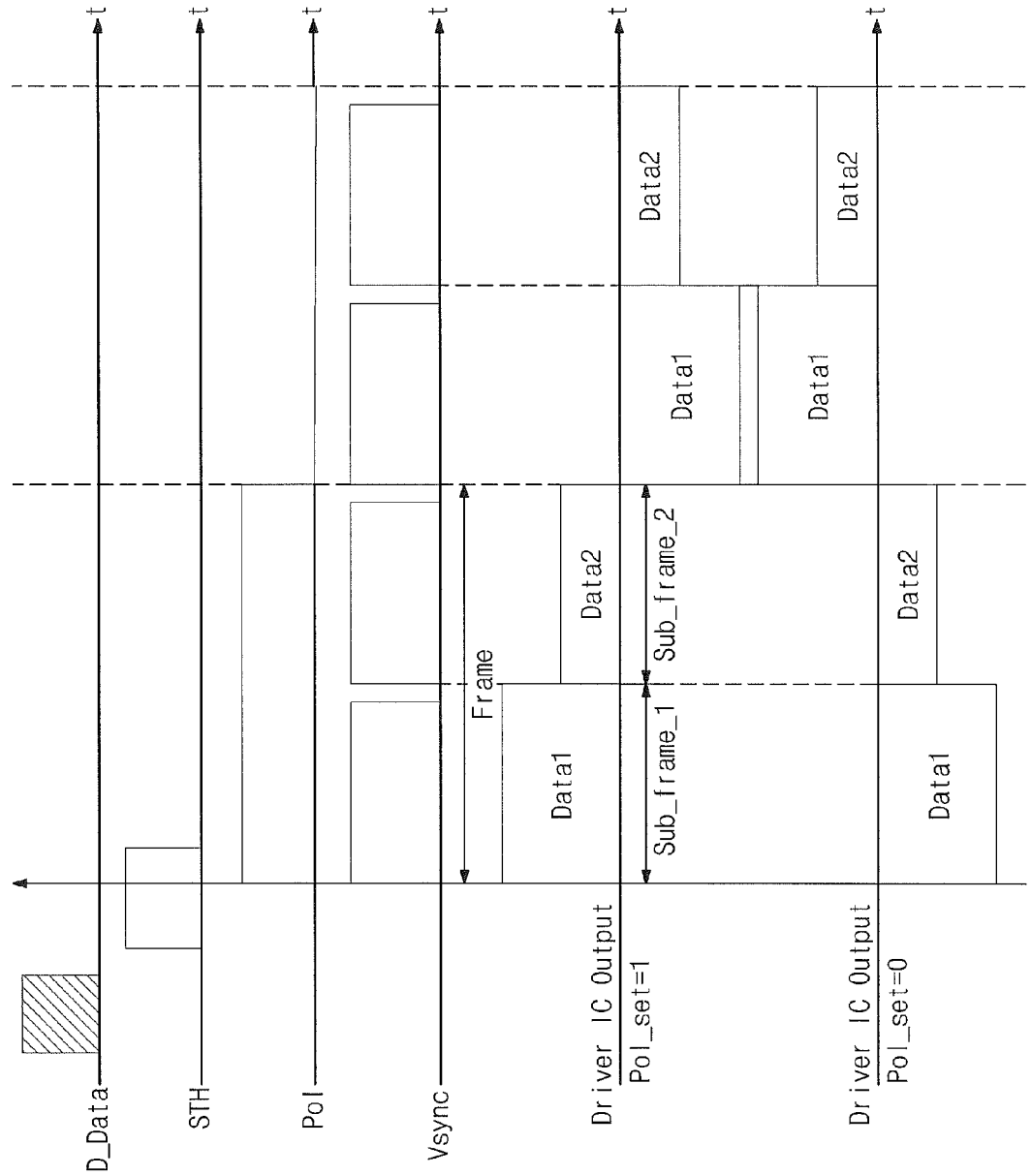
FIG. 5 is a signal timing diagram showing an operation of an exemplary embodiment of driver ICs shown in FIG. 2.

FIG. 5 is a signal timing diagram showing an operation of an exemplary embodiment of the driver ICs shown in FIG. 2.

Referring to FIG. 5, the driver data value D_Data is provided to the first and second driver ICs 171 and 172_1 to 172_n. When the driver data value D_Data is stored in the memory 1711 of each of the first and second driver ICs 171 and 172_1 to 172_n, each of the first and second driver ICs 171 and 172_1 to 172_n is operated to generate the liquid crystal lens driving voltage in response to the horizontal start signal STH.

Each of the first and second driver ICs 171 and 172_1 to 172_n generates the reference voltage and generates the liquid crystal lens driving voltage corresponding to the driver data stored in the memory 1711 using the reference voltage.

When the polarity set value Pol_set of the driver data value D_Data is one (1), the driving voltage generator 1713 alternately outputs the liquid crystal lens driving voltage having the positive (+) polarity and the liquid crystal lens driving voltage having the negative (−) polarity.

The positive (+) liquid crystal lens driving voltage and the negative (−) liquid crystal lens driving voltage are alternately applied to the liquid crystal lens panel 180 in synchronization with the vertical synchronization signal Vsync every frame. Each frame may be configured to include a first sub-frame Sub_frame_1 and a second sub-frame Sub_frame_2.

In such an embodiment, the driving voltage generator 1713 applies the over-driving voltage of the positive (+) liquid crystal lens driving voltage to the liquid crystal lens panel 180 in synchronization with the vertical synchronization signal Vsync during the first sub-frame Sub_frame_1 of a first frame. The over-driving voltage corresponds to the first data value Data1.

The driving voltage generator 1713 applies the normal driving voltage of the positive (+) liquid crystal lens driving voltage to the liquid crystal lens panel 180 in synchronization with a subsequent vertical synchronization signal Vsync during the second sub-frame Sub_frame_2 of the first frame. The normal driving voltage corresponds to the second data value Data2.

After the positive (+) liquid crystal lens driving voltage is applied to the liquid crystal lens panel 180, the driving voltage generator 1713 applies the over-driving voltage of the negative (−) liquid crystal lens driving voltage to the liquid crystal lens panel 180 in synchronization with the vertical synchronization signal Vsync during the first sub-frame Sub_frame_1 of a second frame.

The driving voltage generator 1713 applies the normal driving voltage of the negative (−) liquid crystal lens driving voltage to the liquid crystal lens panel 180 in synchronization with a subsequent vertical synchronization signal Vsync during the second sub-frame Sub_frame_2 of the second frame.

In such an embodiment, the positive (+) liquid crystal lens driving voltage and the negative (−) liquid crystal lens driving voltage are alternately provided to the liquid crystal lens panel 180, and the liquid crystal lens panel 180 is driven by the positive (+) and negative (−) liquid crystal lens driving voltages.

When the polarity set value Pol_set of the driver data value D_Data is zero (0), the driving voltage generator 1713 alternately outputs the liquid crystal lens driving voltage having the negative (−) polarity and the liquid crystal lens driving voltage having the positive (+) polarity in response to the polarity control signal Pol.

The negative (−) liquid crystal lens driving voltage and the positive (+) liquid crystal lens driving voltage are alternately provided to the liquid crystal lens panel 180 every frame in synchronization with the vertical synchronization signal Vsync.

In such an embodiment, the driving voltage generator 1713 applies the over-driving voltage of the negative (−) liquid crystal lens driving voltage to the liquid crystal lens panel 180 in synchronization with the vertical synchronization signal Vsync during the first sub-frame Sub_frame_1 of the first frame. The over-driving voltage corresponds to the first data value Data1.

The driving voltage generator 1713 applies the normal driving voltage of the negative (−) liquid crystal lens driving voltage to the liquid crystal lens panel 180 in synchronization with a subsequent vertical synchronization signal Vsync during the second sub-frame Sub_frame_2 of the first frame. The normal driving voltage corresponds to the second data value Data2.

After the negative (−) liquid crystal lens driving voltage is applied to the liquid crystal lens panel 180, the driving voltage generator 1713 applies the over-driving voltage of the positive (+) liquid crystal lens driving voltage to the liquid crystal lens panel 180 in synchronization with the vertical synchronization signal Vsync during the first sub-frame Sub_frame_1 of the second frame.

The driving voltage generator 1713 applies the normal driving voltage of the positive (+) liquid crystal lens driving voltage to the liquid crystal lens panel 180 in synchronization with a next vertical synchronization signal Vsync during the second sub-frame Sub_frame_2 of the second frame.

In an exemplary embodiment, the negative (−) liquid crystal lens driving voltage and the positive (+) liquid crystal lens driving voltage are alternately provided to the liquid crystal lens panel 180, and the liquid crystal lens panel 180 is driven by the negative (−) and the positive (+) liquid crystal lens driving voltages.

Figure 6:
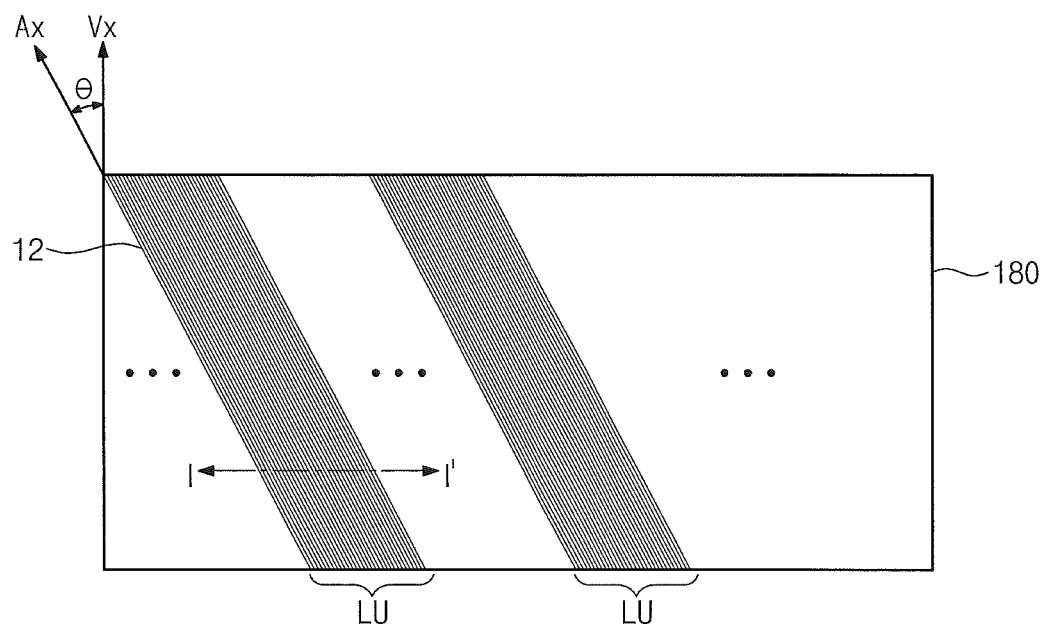
FIG. 6 is a plan view of an exemplary embodiment of a liquid crystal lens panel shown in FIG. 2.
Figure 7:
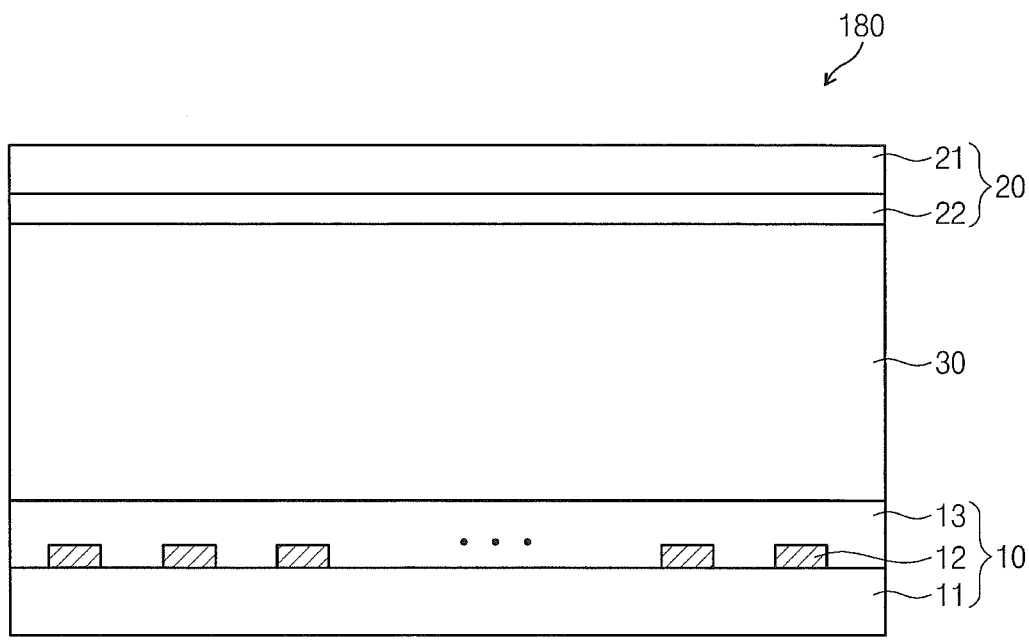
FIG. 7 is a cross-sectional view taken along line I-I' shown in FIG. 6.
Figure 8:
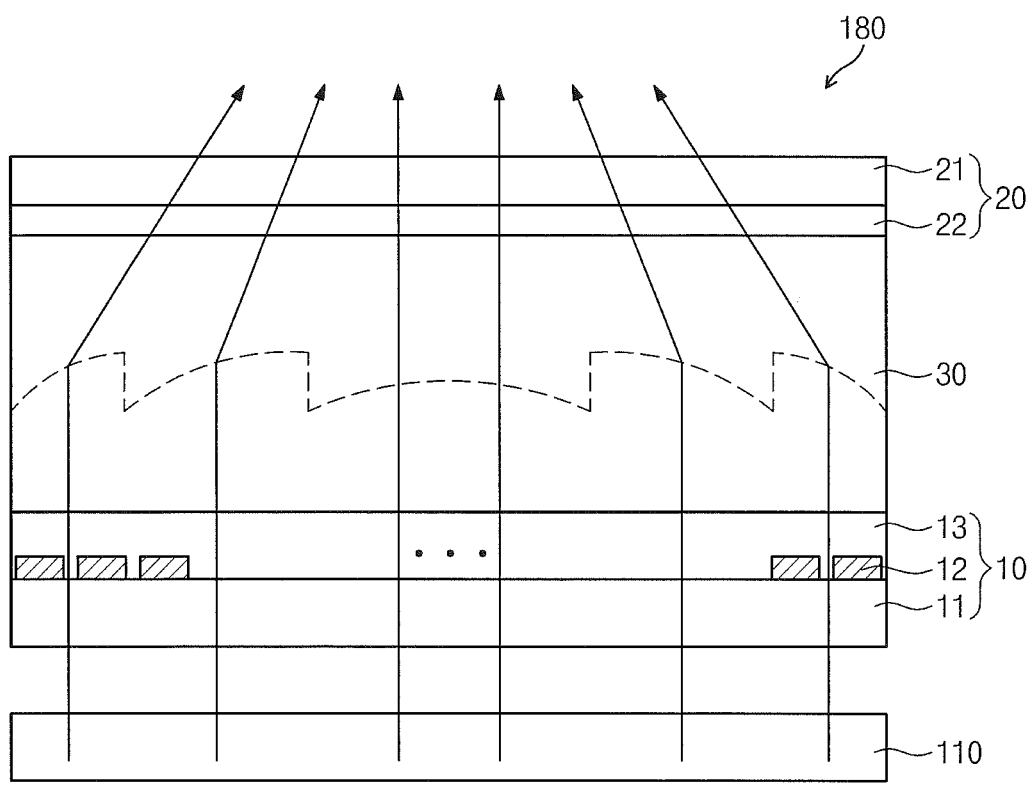
FIG. 8 is a conceptual view illustrating refraction of light by a liquid crystal lens shown in FIG. 6.

FIG. 6 is a plan view of an exemplary embodiment of the liquid crystal lens panel shown in FIG. 2, FIG. 7 is a cross-sectional view taken along line I-I' shown in FIG. 6, and FIG. 8 is a conceptual diagram showing a refraction of light by the liquid crystal lens shown in FIG. 6.

Referring to FIGS. 6 and 7, the liquid crystal lens panel 180 includes a plurality of lens units LU. Each of the lens unit LU is arranged substantially in parallel with a lens axis Ax that is inclined at a predetermined angle θ with respect to a vertical axis Vx. The driver ICs may be disposed, e.g., mounted, on the liquid crystal lens panel 180 and operate a predetermined number of the lens units LU.

In an exemplary embodiment, each of the lens unit LU of the liquid crystal lens panel 180 includes a first substrate 10, a second substrate 20 facing the first substrate 10, and a liquid crystal layer 30 interposed between the first substrate 10 and the second substrate 20.

The first substrate 10 includes a first base substrate 11, a plurality of transparent electrodes 12 arranged on the first base substrate 11 and spaced apart from each other, and an insulating layer 13 disposed on the first base substrate 11 covering the transparent electrodes 12.

The second substrate 20 includes a second base substrate 21 and a common electrode 22 disposed on the second base substrate 21.

When the 3D image display apparatus 100 is operated in the 3D mode, the transparent electrodes 12 are applied with the liquid crystal lens driving voltage, and the common electrode 22 is applied with the common voltage Vcom provided from the power supply unit 150.

The transparent electrodes 12 are applied with continuously changing voltages and constant voltages respectively disposed between the continuously changing voltages, e.g., about zero (0) volt (V), where the continuously varying voltage and the constant voltages are discontinuous.

In an exemplary embodiment, when the voltages are applied to the transparent electrodes 12 and the common electrode 22, liquid crystal molecules of the liquid crystal layer 30 are aligned by an electric field generated by the applied voltage to have an optical path distribution corresponding to Fresnel lens. In such an embodiment, each of the lens units LU operates to act as the Fresnel lens.

In one exemplary embodiment, for example, an area corresponding to the transparent electrodes 12 that receives the continuously changing voltages corresponds to circular-arc zone of the Fresnel lens, and an area corresponding to the transparent electrodes 12 that receives the constant voltages corresponds to a border between the circular-arc zones of the Fresnel lens.

Referring to FIG. 8, when the 3D image display apparatus 100 displays the 3D image, the liquid crystal lens driving voltage is applied to the transparent electrodes 12 of the liquid crystal lens panel 180, and the common voltage Vcom is applied to the common electrode 22.

The liquid crystal molecules of the liquid crystal layer 30 are aligned by the electric field generated by the applied voltage to have the optical path distribution corresponding to Fresnel lens. In an exemplary embodiment, as shown in a dot line of FIG. 8, each of the lens units LU operates to act as the Fresnel lens.

An area corresponding to the transparent electrodes 12 that receives the continuously changing voltages corresponds to circular-arc zone of the Fresnel lens, and an area corresponding to the transparent electrodes 12 that receives the constant voltages corresponds to a border between the circular-arc zones of the Fresnel lens.

The liquid crystal lens panel 180, which operates to act as the Fresnel lens, substantially refracts the light provided from the display panel 110 such that the 3D image is provided to the observer.

In an exemplary embodiment, the number of parts and interfaces in the 3D image display apparatus 100 may be reduced such that the operation of the liquid crystal lens panel 180 is substantially simplified and the power consumption in the liquid crystal lens panel 180 is substantially reduced.

Although the exemplary embodiments of the invention have been described, it is understood that the invention should not be limited to the exemplary embodiments described herein but various changes and modifications can be made by one ordinary skilled in the art within the spirit and scope of the invention as hereinafter claimed.

What is claimed is:

1. A three-dimensional (3D) image display apparatus comprising:
    a display panel which displays an image;
    a liquid crystal lens panel which refracts a light exiting from the display panel;
    a lens driver which drives the liquid crystal lens panel;
    a timing controller which controls the lens driver;
    a power supply unit which provides the liquid crystal lens panel with a driving voltage in response to a control of the timing controller; and
    a driver data value storage unit which stores a driver data value and applies the driver data value stored therein to the lens driver when the driver data value storage unit is turned on,
    wherein the lens driver operates the liquid crystal lens panel using the driving voltage and the driver data value in response to the control of the timing controller,
    wherein the lens driver comprises a plurality of driver integrated circuits (ICs) which drives the liquid crystal lens panel,
    wherein the driver ICs comprise:
    a first driver IC which provides a read-out signal to the driver data value storage unit in synchronization with a serial clock signal generated therein and receives the driver data value from the driver data value storage unit in response to the read-out signal; and
    a plurality of second driver ICs connected to the first driver IC,
    wherein the first driver IC provides the driver data value to an adjacent second driver IC of the second driver ICs, and
    wherein each of the second driver ICs provides the driver data value to a subsequent second driver IC disposed adjacent thereto,
    wherein each of the first and second driver ICs comprises:
    a memory which stores the driver data value;
    a reference voltage generator which generates a reference voltage using the driving voltage; and
    a driving voltage generator which generates a liquid crystal lens driving voltage corresponding to the driver data value using the reference voltage in response to a horizontal start signal provided from the timing controller,
    wherein the driving voltage generator converts a polarity of the liquid crystal lens driving voltage every frame in response to a polarity control signal provided from the timing controller to alternately output the liquid crystal lens driving voltage and the converted liquid crystal lens driving voltage, and
    wherein the driving voltage generator applies the liquid crystal lens driving voltage and the converted liquid crystal lens driving voltage to the liquid crystal lens panel in synchronization with a vertical synchronization signal provided from the timing controller.

2. The 3D image display apparatus of claim 1, wherein the driver ICs are disposed on the liquid crystal lens panel.

3. The 3D image display apparatus of claim 1, wherein the driver data value comprises:
    a first data value;
    a second data value; and
    a polarity set value, and
    the liquid crystal lens driving voltage comprises:
    an over-driving voltage corresponding to the first data value; and
    a normal driving voltage corresponding to the second data value and having a level lower than a level of the over-driving voltage.

4. The 3D image display apparatus of claim 3, wherein the driver data value has k bits,
    the first data value is stored in l bits,
    the second data value is stored in m bits,
    the polarity set value is stored in j bits,
    each of k, l, m is a natural number, and
    k is equal to a sum of l, m and j.

5. The 3D image display apparatus of claim 4, wherein k is 17, l is 8, m is 8, and j is one (1).

6. The 3D image display apparatus of claim 3, wherein each frame comprises:
   a first sub-frame in which the over-driving voltage is output; and
   a second sub-frame in which the normal driving voltage is output.

7. The 3D image display apparatus of claim 6, wherein the vertical synchronization signal comprises:
   a first vertical synchronization signal; and
   a second vertical synchronization signal subsequent to the first vertical synchronization signal,
   wherein the over-driving voltage is output in synchronization with the first vertical synchronization signal, and the normal driving voltage is output in synchronization with the second vertical synchronization signal.

8. The 3D image display apparatus of claim 3, wherein the driving voltage generator determines a polarity of the liquid crystal lens driving voltage based on the polarity set value.

9. The 3D image display apparatus of claim 8, wherein
   the driving voltage generator outputs a positive liquid crystal lens driving voltage when the polarity set value is one (1),
   the driving voltage generator converts the polarity of the liquid crystal lens driving voltage in response to the polarity control signal to output a negative liquid crystal lens driving voltage, and
   the positive and negative liquid crystal lens driving voltages are sequentially and alternately output.

10. The 3D image display apparatus of claim 8, wherein
    the driving voltage generator outputs a negative liquid crystal lens driving voltage when the polarity set value is zero (0),
    the driving voltage generator converts the polarity of the liquid crystal lens driving voltage in response to the polarity control signal to output a positive liquid crystal lens driving voltage, and
    the negative and positive liquid crystal lens driving voltages are sequentially and alternately output.

11. The 3D image display apparatus of claim 1, wherein the driving voltage comprises:
    an analog power voltage; and
    a common voltage.

12. The 3D image display apparatus of claim 11, wherein the first driver IC further comprises:
    a serial clock terminal which outputs the serial clock signal;
    a serial data terminal which outputs the read-out signal in synchronization with the serial clock signal and receives the driver data value from the driver data value storage unit in response to the read-out signal;
    a first control terminal which receives the vertical synchronization signal;
    a second control terminal which receives the polarity control signal;
    a third control terminal which receives the horizontal start signal;
    a first voltage receiving terminal which receives the analog power voltage; and
    a second voltage receiving terminal which receives the common voltage.

13. The 3D image display apparatus of claim 11, wherein each of the second driver ICs further comprises:
    a first control terminal which receives the vertical synchronization signal;
    a second control terminal which receives the polarity control signal;
    a third control terminal which receives the horizontal start signal;
    a first voltage receiving terminal which receives the analog power voltage; and
    a second voltage receiving terminal which receives the common voltage.

14. The 3D image display apparatus of claim 1, wherein
    the driver data value storage unit comprises a programmable read-only memory, and
    the driver data value is stored in the programmable read-only memory.

15. The 3D image display apparatus of claim 1, wherein the display panel comprises:
    a plurality of gate lines;
    a plurality of data line insulated from and crossing the gate lines; and
    a plurality of pixels, wherein each of the pixels is connected to a corresponding gate line of the gate lines and a corresponding data line of the data lines.

16. The 3D image display apparatus of claim 15, further comprising:
    a backlight unit which provides the light to the display panel;
    a gate driver which sequentially applies a scan signal to the gate lines in response to control signals from the timing controller; and
    a data driver which applies a data voltage to the data lines in response to the control signals from the timing controller,
    wherein the pixels display the image in response to the scan signal applied through the gate lines and the data voltage applied through the data lines.

17. The 3D image display apparatus of claim 1, wherein the liquid crystal lens panel operates to serve as a Fresnel lens.

18. The 3D image display apparatus of claim 1, further comprising a backlight unit that provides the display panel with light.

* * * * *